March 1, 1949. R. R. BANER 2,463,349
ELECTRIC MOTOR ASSEMBLY
Filed Jan. 20, 1948 2 Sheets-Sheet 1

INVENTOR:
Rawlings R. Baner
BY Robt W Pearson
ATTORNEY.

March 1, 1949. R. R. BANER 2,463,349
ELECTRIC MOTOR ASSEMBLY
Filed Jan. 20, 1948 2 Sheets-Sheet 2

INVENTOR.
Rawlings R. Baner
BY
Robt W. Pearson
ATTORNEY.

Patented Mar. 1, 1949

2,463,349

UNITED STATES PATENT OFFICE 2,463,349

ELECTRIC MOTOR ASSEMBLY

Rawlings R. Baner, Hollywood, Calif.

Application January 20, 1948, Serial No. 3,335

5 Claims. (Cl. 172—36)

My invention relates to electric motor assemblies and particularly to arrangements of two or more such motors or generators in a single unit.

It is often desirable to provide an electric drive unit in a space insufficient to accommodate a motor of the requisite power if of standard design, and it is an object of the invention to provide an arrangement whereby a maximum torque may be secured from an electric motor assembly at minimum axial length.

It is a further object of my invention to provide an assembly of two or more electric motors in a housing built up of a number of parts which may be readily manufactured and quickly assembled to provide units of the power required.

It is still a further object of the invention to provide a multi-motor unit which may be readily assembled with accuracy and will retain the proper alignment of the various shafts and housing parts in assembled use.

Yet further objects and features of my invention will hereinafter appear from the following description taken in conjunction with the accompanying drawings showing a preferred embodiment of the invention, but it is to be understood that various changes, modifications or rearrangement of parts may be made by those skilled in the art without departing from the scope of the invention as intended to be defined by the appended claims.

In the drawings.

In the figures of the drawings the usual leads, hold down bolts and similar parts not forming part of my invention have been omitted for clearness.

Figure 1:
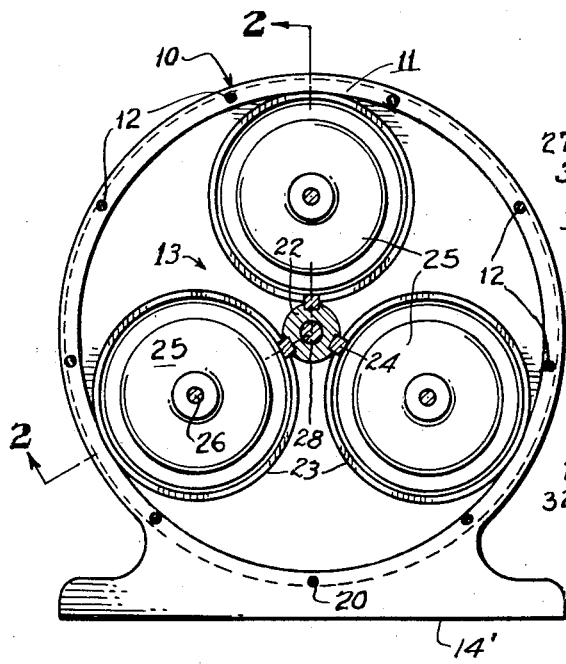
Fig. 1 is a view in front elevation of the housing of an electric motor unit incorporating the novel features of my invention, taken on line 1—1 of Fig. 2.
Figure 2:
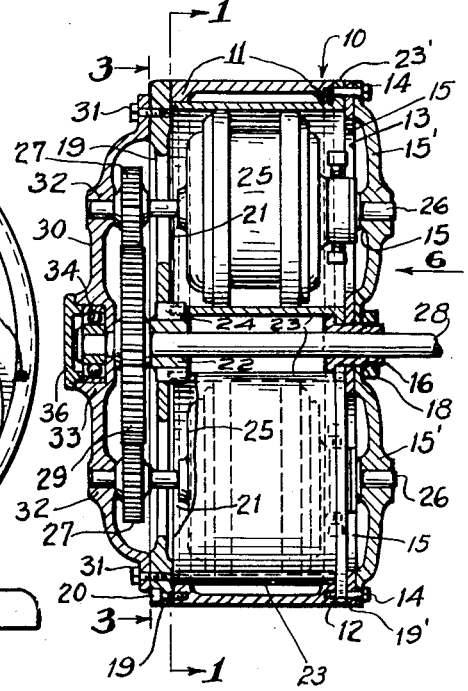
Fig. 2 is a section taken on line 2—2 of Fig. 1, with some parts shown unsectioned for clearness.
Figure 3:
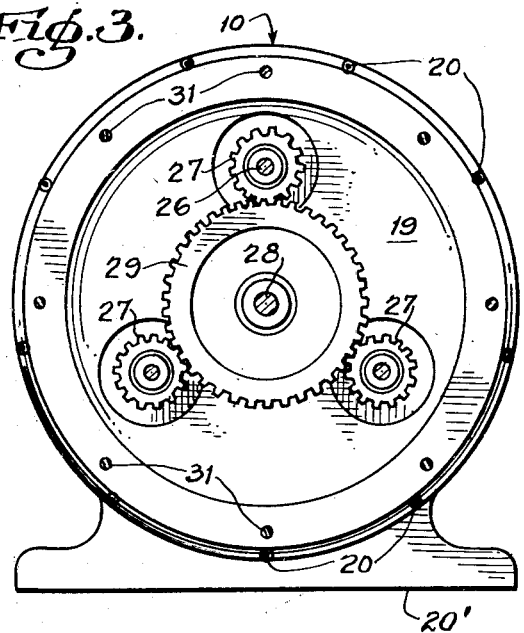
Fig. 3 is a view on line 3—3 of Fig. 2.
Figure 4:
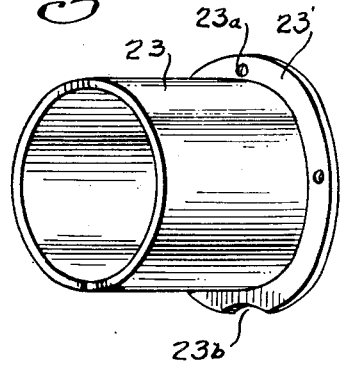
Fig. 4 is a perspective view of a sleeve forming part of the mounting of each motor comprised in the unit.
Figure 5:
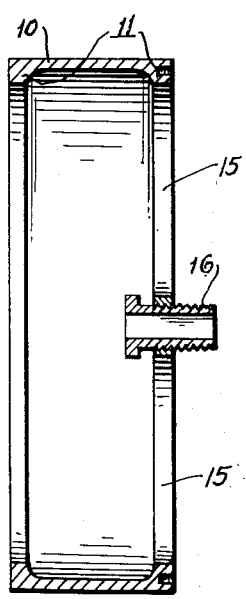
Fig. 5 is a vertical section through the center member or drum of the housing, taken on line 5—5 of Fig. 6.
Figure 6:
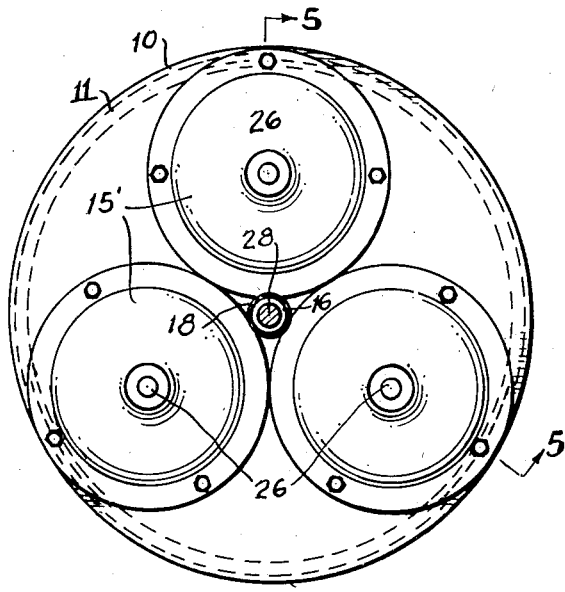
Fig. 6 is a view of Fig. 5 looking in the direction of the arrow, in Fig. 2.
Figure 7:
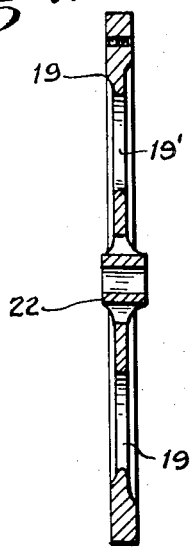
Fig. 7 is a vertical section through the front plate of the housing, taken on line 7—7 of Fig. 8.
Figure 8:
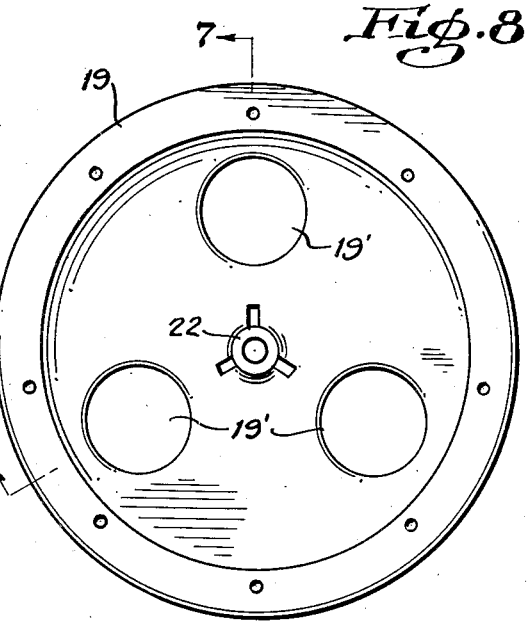
Fig. 8 is a front elevation of Fig. 7.

The numeral 10 indicates generally a housing body arranged to contain three motors but it is to be understood that the housing may be arranged to contain any number of motors in excess of two.

The housing body may be formed as a hollow ring shaped casting preferably having thickened rims 11 provided with a plurality of threaded bores 12 equally spaced around the rims.

A front end plate 13 is secured to the housing body by studs 14 engaging in bores 12 and is provided with a foot 14'. The end plate 13 is machined to provide three equally spaced circular openings 15 surrounding a central bored boss. Openings 15 are each covered by a bearing cap 15', the bearing caps being provided with central bosses drilled to provide a motor shaft bearing. A front bearing sleeve 16 is threaded to receive a lock nut 18 on its outer end, and is fitted in the opening of the central boss of the front end plate 13.

The opposite end of the housing is provided with a back end plate 19 secured by threaded studs 20 engaging in the threaded bores in the rear edge or rim 11 of the body. The plate 19 is formed with openings 19' aligned with the motors mounted in the housing as later described.

The end plate 19 is machined to receive a sleeve 22 drilled to act as a bearing for a driven shaft. The motor mounting sleeves 23 are provided with a mounting flange 23' drilled at 23a and cut out at 23b to fit tightly against the front bearing sleeve 16, and are clamped between the front plate 13 and member 10 by certain of the bolts 14. At the back end keys 24 projecting from sleeve 22 fit in keyways cut in the edge of each sleeve 23. A motor 25 is mounted in any suitable manner in each motor mounting sleeve 23 so that it is held against rotation therein, the motor shafts 26 extending through the bearing bosses in the front bearing caps 15'. The motor shafts project rearwardly and are fitted with driving pinions 27. A driven shaft 28 extends through the bearings in the front bearing sleeve 16 and back bearing sleeve 22 and carries a gear 29 meshing with the driven shaft by pinions 27.

A back gear cover and bearing plate 30 is secured to the back end plate 19 by threaded studs 31. The back cover plate 30 is provided with bosses 32 drilled to act as back bearings for the motor shafts. The back cover plate 30 is also provided with a center boss 33 machined to receive a ball bearing 34 supporting the rear end of the driven shaft 28, which bearing is held in place by a cap 36.

In assembling the electric motor unit the motors are, or may be, first mounted in the mounting sleeves 23 and the sleeves secured to the front end plate 13 with the caps 15 and the end plate and with the motors thereon inserted into the body 10 on which the apertured back has been secured. The driven shaft is then inserted in place with its gear engaging with the pinions on the motor shaft, and finally the gear cover plate may be secured in place. The caps 15' may be readily removed enabling the commutator and brushes of the motors to be serviced when required without removing the motors.

It will be seen from the preceding description that I have proved a novel and useful multimotor assembly that may be readily and inexpensively produced in a variety of powers and adapted to a wide variety of uses.

I claim:

1. An electric motor assembly comprising a ring-like housing body member; a front end plate and a back end cover plate secured to opposite sides of said body member; aligned motor bearings and aligned bearings for a driven shaft formed in said end cover plate and supported by said front end plate; a plurality of electric motors mounted in said housing and held against rotation therein with the motor shafts supported in said motor bearings; a driven shaft mounted in the bearings provided therefor; pinions secured on the ends of the motor shafts and a gear mounted on the end of the driven shaft and driven by said pinions; an end plate secured to the back end of the housing and a bearing sleeve supported in said back end plate effective to support said driven shaft.

2. An electric motor assembly comprising a ring-like housing body member; a front end plate and a back end cover plate secured to opposite sides of said body member; aligned motor bearings and aligned bearings for a driven shaft formed in said end cover plate and supported on said front end plate, the bearings for the driven shaft provided in the back end cover plate having rolling antifriction elements arranged therein; a plurality of electric motors mounted in said housing and held against rotation therein with the motor shafts supported in said motor bearings; a driven shaft mounted in the bearings provided therefor; pinions secured on the ends of the motor shafts and a gear mounted on the end of the driven shaft and driven by said pinions; an end plate secured to the back of the housing, and having an opening therein enabling the pinions on the motor shafts to project therethrough, and a central opening therein; and a bearing sleeve for the driven shaft fitted in said central opening.

3. An electric motor assembly comprising a housing body member; a front end plate and a back end plate secured to opposite sides of said body member; a driven shaft supported in bearings in said end plates; a plurality of tubular sleeves secured rigidly in position in the housing about said shaft by said end plates; electric motors mounted in said sleeves and held against rotation therein, a motor shaft rotated by each of said motors the motor shafts and driven shaft extending through the back end plate; and driving connections between said motor shafts and the driven shaft arranged outside said end plate.

4. An electric motor assembly comprising a housing body member; a front end plate and a back end plate secured to opposite sides of said body member; a driven shaft extending through said end plates; a plurality of tubular sleeves secured rigidly in position in the housing about said shaft by said end plates; electric motors mounted in said sleeves and held against rotation therein, a motor shaft rotated by each of said motors the motor shafts and driven shaft extending through the back end plate; and driving connections between said motor shafts and the driven shaft; and a cover end bearing plate secured to the back end plate and effective to enclose the driving connections and support the outer ends of the motor and driven shafts.

5. An electric motor assembly comprising a ring like housing body member; a front end plate and a back end cover plate secured to opposite sides of said body member; pairs of aligned motor bearings and aligned bearings for a driven shaft supported in said end cover plate and by said front end plate; a plurality of electric motors mounted in said housing and held against rotation therein with the motor shafts supported in said motor bearings; a driven shaft mounted in the bearings provided therefor; and driving connections between said motor shafts and the driven shaft effective to transmit the torque developed by the motors to said driven shaft, said front end plate being provided with apertures to allow access to the electric motors and in addition comprising caps removably covering said apertures, the front bearings of the aforesaid pairs of motor bearings being located in said caps.

RAWLINGS R. BANER.

REFERENCES CITED

The following references are of record in the file of this patent:

UNITED STATES PATENTS

| Number | Name | Date |
|---|---|---|
| 907,176 | Richardson | Dec. 22, 1908 |
| 909,057 | Burke | Jan. 5, 1909 |
| 993,352 | Duntley | May 30, 1911 |
| 1,292,592 | Ferris | Jan. 28, 1919 |